Feb. 3, 1953

B. O'BRIEN 2,627,199

OPTICAL IMAGE DISSECTING APPARATUS

Filed Oct. 2, 1948

INVENTOR.
Brian O'Brien
BY Charles Shepard
his Attorney

Feb. 3, 1953   B. O'BRIEN   2,627,199
OPTICAL IMAGE DISSECTING APPARATUS
Filed Oct. 2, 1948   3 Sheets-Sheet 2
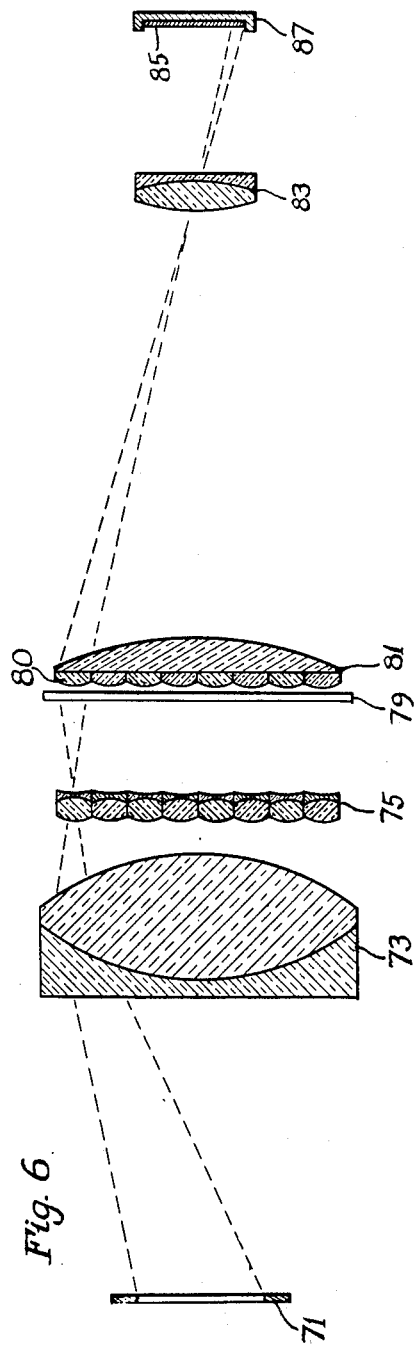
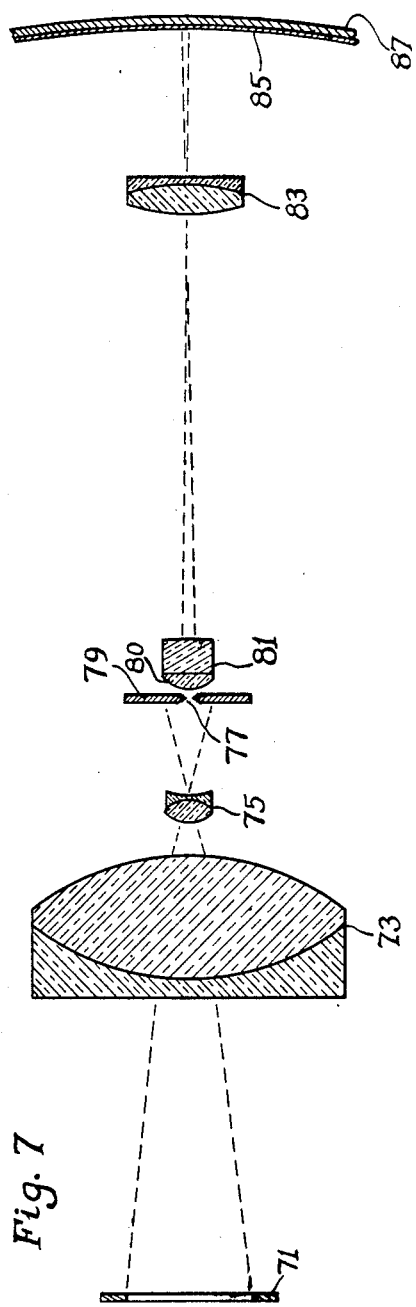
INVENTOR.
Brian O'Brien
BY Charles Shepard
his Attorney Feb. 3, 1953  B. O'BRIEN  2,627,199
OPTICAL IMAGE DISSECTING APPARATUS
Filed Oct. 2, 1948  3 Sheets-Sheet 3
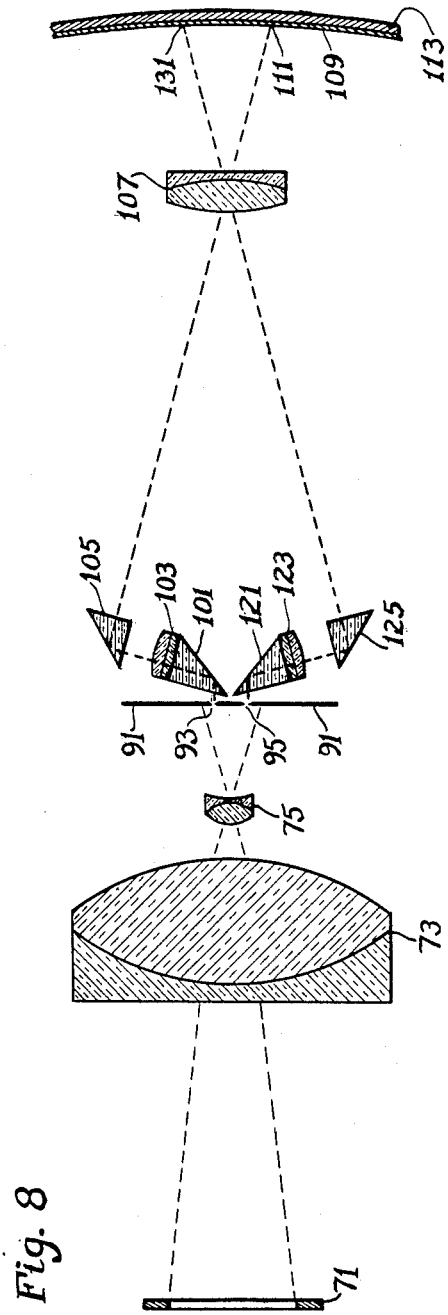
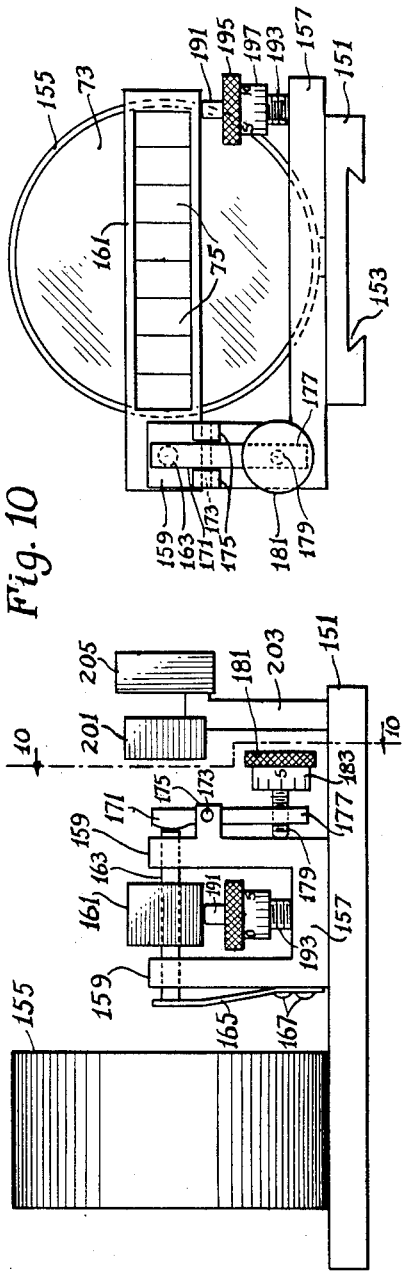
INVENTOR.
Brian O'Brien
BY Charles Shepard
his Attorney Patented Feb. 3, 1953

2,627,199

UNITED STATES PATENT OFFICE 2,627,199

OPTICAL IMAGE DISSECTING APPARATUS

Brian O'Brien, Pittsford, N. Y.

Application October 2, 1948, Serial No. 52,474

10 Claims. (Cl. 88—1)

The present invention relates to a method of optical dissection of an image, and to an appliance for optically producing, from an object of one shape, an image of a materially different shape, but under such accurately controlled and precise conditions that the image (if recorded, for example, on a motion picture film) can be re-transformed into an image of the same shape as the original object. More specifically, the appliance enables the production, by optical means, of an image of an object which is, for example, of square or rectangular shape, the image however being transformed into the shape of a single long narrow line or, in some instances, multiple lines spaced from and parallel to each other, the image line or lines being of suitable form to be recorded on a photographic plate or film, such as a motion picture film. An optical appliance of this kind may be conveniently designated as an image dissector.

The broad principle of image dissection has previously been suggested. It is, however, an object of the present invention to provide an improved and more satisfactory image dissector, and an improved method of image dissection, as compared with those previously shown.

Another object of the invention is the provision of an image dissector so designed and constructed that the image formed thereby is in the form of a true straight line, rather than in the form of a series of short lines in stepped or echelon relationship to each other.

Still another object of the invention is the provision of an image dissector in such a form as to be particularly suitable and satisfactory in securing ultra high speed motion picture photographs of a moving object.

A further object of the invention is the provision of an image dissector so designed as to give improved definition and accuracy as compared with the image dissectors of the prior art.

A still further object is the provision of an image dissector which is relatively simple and inexpensive to construct to a high degree of precision, and particularly one in which the optical elements may be spherical lenses, requiring no cylindrical lenses and no laminae.

These and other desirable objects are accomplished by the construction disclosed as an illustrative embodiment of the invention in the following description and in the accompanying drawings forming a part hereof, in which:

Fig. 6 is a diagrammatic section through one form of the image dissector of the present invention, the section being taken approximately on a horizontal plane along the optical axis of the appliance;

Fig. 7 is a diagrammatic section through the same apparatus, taken approximately on a vertical plane extending along the optical axis;

Fig. 8 is a view similar to Fig. 7 showing a modified form of apparatus;

Fig. 9 is a side elevation of a portion of the image dissecting apparatus; and

Fig. 10 is a vertical section taken approximately on the line 10—10 of Fig. 9.

The same reference numerals throughout the several views indicate the same parts.

Figure 1:
Fig. 1 is a diagrammatic view of an object whose image is to be dissected according to the present invention.

It is believed that the principles of image dissection may be best understood by referring first to the diagrammatic views constituting Figs. 1–5 of the present drawings. In Fig. 1 there is shown diagrammatically an object from which a dissected image is to be formed. This object, as indicated at 20, comprises, for example, a square field of white background having the block letter A formed thereon in black. For the sake of explaining the principles more readily, the object 20 is here shown as being subdivided by light horizontal lines into a series of six equal horizontal strips 21 to 26, inclusive. Actually, the object is not thus subdivided, but these imaginary horizontal strips 21 to 26 will be convenient in understanding the dissection of the image.

An image of the object 20 may, of course, be projected by an objective lens in known manner well understood in the optical art. If a series of objective lenses be placed side by side to form what may be called a multiple lens, and if the object be at infinity (in an optical sense) with respect to the lenses, then a series of identical images (which may be called a multiple image)

will be formed in similar side by side relationship, one image being formed by each lens.

Figure 2:
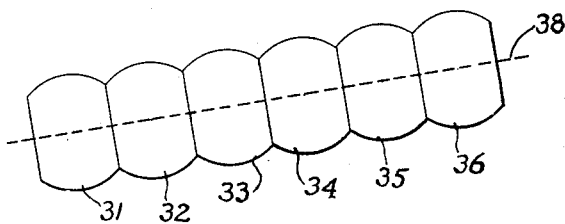
Fig. 2 is a diagrammatic face view of a multiple lens system for producing a multiple image of the object shown in Fig. 1.

A series of lenses, or multiple lens, is shown diagrammatically in Fig. 2, where six lenses are shown, identified by the numerals 31 to 36, inclusive. These are preferably spherical objective lenses, and for the sake of compactness their lateral meeting edges are formed flat or straight so that the lenses can be blocked together compactly, as shown. Now if the object 20 (Fig. 1) is placed optically at infinity with respect to the multiple lens 31–36, as for example by interposing an objective lens to collimate the light from the object, each of the multiple lens elements 31–36 will form, as above mentioned, an identical and complete image of the object. The images thus formed are indicated diagrammatically in Fig. 3 at 41 to 46, inclusive.

It will be noted in Fig. 2 that the dotted line 38 joining the optical centers of the respective lenses 31–36 is not quite horizontal but is arranged at a slight angle to the horizontal. Consequently, since the optical center of each succeeding lens is slightly higher than the optical center of the preceding lens, it follows that the image formed by each succeeding lens will be correspondingly higher than the image formed by the preceding lens, so that the images will be in the stepped relation indicated in Fig. 3.

Figure 3:
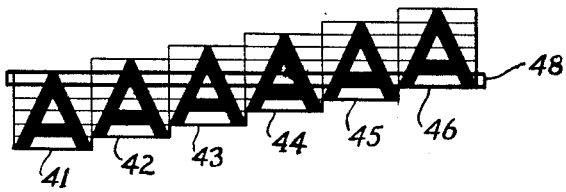
Fig. 3 is a diagrammatic view of the multiple image formed by the multiple lens system of Fig. 2, together with a diagrammatic indication of the slit through which the multiple image is viewed for dissection purposes.

If the multiple image of Fig. 3 now be viewed through a long narrow slit, there will be visible through this slit only a portion of each separate image 41 to 46, inclusive. If the slit is parallel to the line 38 (Fig. 2) joining the optical centers of the lenses forming the multiple image, then the slit will reveal an identical part of each image. But if, on the contrary, the slit is placed at an angle to the line 38 joining the optical centers of the lenses, the slit will reveal one portion of one image, another portion of the second image, still another portion of the third image, and so on. This is well shown in Fig. 3, where the slit is indicated diagrammatically by the heavy rectangle 48. In this illustration, the slit is so proportioned and adjusted as to pick up or reveal only the top horizontal strip 21 (Fig. 1) from the first image 41 (Fig. 3), the second horizontal strip 22 from the second image 42, the third horizontal strip 23 from the third image 43, and so on, picking up only the sixth or lowest horizontal strip 26 from the sixth and last image 46.

Figure 4:
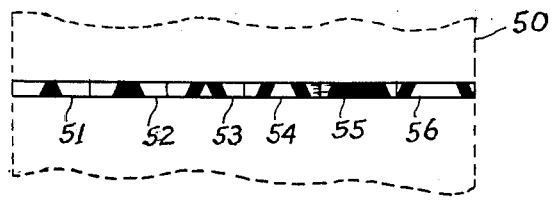
Fig. 4 is a diagrammatic view of the dissected image according to one embodiment of the present invention.

Although the slit 48 reveals only a fraction of each image 41 to 46, inclusive, yet it is a different fraction of each image, and since all the images are identical, it follows that if the mechanism be properly proportioned and adjusted the sum total of all the image parts picked up or revealed by the slot 48 will be equal to the sum total of one complete image. However, the parts of the image will now be arranged horizontally in end to end relationship, in a straight line, instead of being arranged one above another as were the parts 21 to 26, inclusive, in Fig. 1. The image parts or fractions revealed by the slit 48 may now be projected onto a photographic film or other suitable receiving surface diagrammatically indicated at 50 in Fig. 4, in which figure the image part taken from the image 41 is indicated at 51, the part taken from the image 42 is indicated at 52 and so on, the part taken from the last image 46 being indicated at 56. It is seen that the image part 51 is identical with the part 21 of the original object 20, the image part 52 is identical with the part 22 of the original object, the image part 53 is identical with the part 23 of the original object, and so on. But the image parts 51 to 56, although collectively including an image of every part of the original object 20, are rearranged, as already mentioned, into a single straight line as indicated in Fig. 4, instead of being arranged one above the other in a vertical column as were the parts 21 to 26 of the original object 20. It is as though a picture of the original object 20 were actually cut by scissors, along the light horizontal lines, into a series of horizontal strips, and these strips were rearranged end to end. Because of this cutting up and rearrangement of the parts of the image of the original object, the image may be said to be dissected, and the appliance for accomplishing this may be called an image dissector.

A dissected image of this kind has various uses, one of which, for example, is in the field of ultra high speed motion picture photography. If it is desired, for analysis purposes, to take a motion picture of a rapidly moving object at a very fast rate of picture taking, so as to slow down to a great extent the high speed of the object for subsequent analysis purposes, the motion picture film must be moved through the camera exceedingly rapidly because of the substantial length of film required for each exposure or "frame" of the conventional shape. But if the image could be reformed or redisposed from the conventional almost square shape into the shape of a thin or narrow line or band extending transversely of the motion picture film, it is seen that a much smaller length of film would be required for each exposure or "frame" and consequently the speed of longitudinal travel of the film could be considerably slower for a given number of exposures or "frames" per second. The present image dissecting appliance enables this desirable redisposition or reformation of the image of the scene which is to be photographed, into the shape of a very narrow band or line extending crosswise of the motion picture film, as indicated in Fig. 4, so that with the present invention it is possible to secure extremely high speed motion pictures, in some instances at the almost incredible speed of somewhat more than ten million frames per second. After the photograph has been made at the required high speed, then the dissected image may be optically taken apart or dissected and transposed back to the original form or shape of the conventional motion picture frame for leisurely analysis of the photographs.

Figure 5:
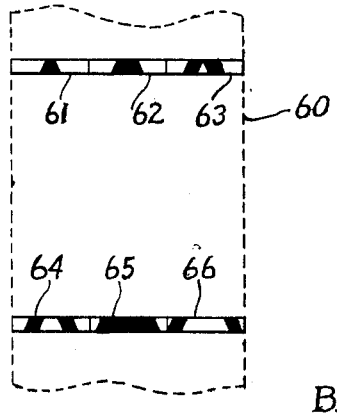
Fig. 5 is a diagrammatic view of the dissected image according to another embodiment of the present invention.

Instead of using a single slit 48 as indicated in Figs. 3 and 4, it is possible to use two or more slits so arranged that one slit picks up one part of each multiple image, the parts picked up by the two slits together constituting a dissected equivalent of the entire object. In that case, the dissected image, instead of being arranged in a single line across the photographic film or other support, is projected in two parallel and spaced lines when two slits are used, or three parallel spaced lines when three slits are used. Fig. 5 illustrates diagrammatically the principles of dissection when two slits are employed, the photographic film being indicated at 60. The dissected image portions 61, 62, and 63 are projected in one line across the film 60, and are identical with the portions 21, 22, and 23 of the original object 20. Through a separate slit, the portions 64, 65, and 66 of the dissected image are projected onto the film 60 in a second line substantially spaced from the first line, these image portions 64, 65, and 66 being identical with the portions 24, 25, and 26 of the original object.

Actually, each line of the dissected image will contain as many image elements as the number of lens elements in the multiple lens, but when two slits are used, each slit (and consequently each image element) will be only half as wide as when a single slit is used, or one-third as wide when three slits are used. So actually, if six lens elements are used as in Fig. 2, then the top line of projected images in Fig. 5 would contain six image elements each half as wide (in a vertical direction) as those in Fig. 4, and collectively corresponding to the upper half of the object, and the lower line of projected images would likewise contain six image elements collectively corresponding to the lower half of the object. But for the sake of simplicity and clarity of illustration, Fig. 5 shows only three image elements in each projected line of images, which is the situation that would occur if, in a two slit apparatus, only three lens elements instead of six were used.

Referring now to Figs. 6 and 7, showing diagrammatically a preferred form of dissecting apparatus, the object whose image is to be dissected is framed or outlined by the aperture in the rectangular frame 71. The objective lens 73 collimates the light rays from the object at 71, so as to place the object optically at infinity with respect to the multiple lens 75 which corresponds to the multiple lens 31–36 in Fig. 2, and consists, as previously explained, of a series of objectives preferably having their lateral edges straight or flat so that they may be compactly assembled. The lenses 75 are objectives of high optical quality.

These objectives 75 focus identical images of the object 71 in the plane of a slit 77 formed in an opaque plate 79. This slit 77 corresponds to the slit 48 of Fig. 3. As explained in connection with Figs. 2 and 3, the slit 77 is not parallel to but is at a slight angle with respect to a line joining the optical centers of the various elements constituting the multiple lens 75.

Behind the slit 77 but in close proximity thereto is the field lens or collective 80—81 consisting of a set of small lenses 80, one for each lens of the multiple objective 75 and having approximately the same focal length as 75, and a single collective 81 of focal length approximately equal to the distance from 81 to objective lens 83, which may be conveniently termed the main objective. Lenses 80 and 81 may be in contact or not, as convenient, and serve to image the apertures of all the elements of the multiple objective 75 superimposed upon each other and upon the aperture of the lens 83, which is a high quality objective which forms an image of the slit 77 on a suitable support or receiving surface, such as a photographic plate or film. Conveniently, the receiving surface is a strip 85 of motion picture film, held in a groove in a carrier 87 which is conveniently formed as a cylindrical rim on a rotating body so that, upon rotation thereof, successive portions of the film 85 are carried past the image line formed by the objective lens 83, to form a streak image on the film.

As explained in connection with Figs. 1–4, the various segments of the objective lens 75 form identical and complete images of the object 71 in side by side relationship along the length of the slot 77. Due to the slight inclination of the slot 77 with respect to these images, the slot picks up or reveals a slightly different part of each image. The parts of image which are permitted to pass through the slot are collected by the collecting lens or field lens 81 and are focused by the objective 83 onto the support such as the strip of motion picture film 85, corresponding to the support 50 in Fig. 4, and the dissected image is placed on the film 85 in the form of a long narrow strip or line extending across the width of the film, with the dissected elements of the image arranged in end to end straight-line relationship as indicated in Fig. 4.

For best optical efficiency, the collectives 80 are so placed that a line passing through their optical centers is inclined with respect to the slit, in the same direction as the inclination of the line (see 38, Fig. 2) joining the optical centers of the lenses 75, but to a lesser amount.

For simplicity of illustration, only a few lens elements are shown in the multiple lenses in Fig. 2 and in Fig 6. In actual practice, a considerable number of lens elements are used, preferably fifteen or more. The width of the slit 77 may conveniently be about one-twentieth of one millimeter, and the image of the slit formed by the objective 83 on the film 85 has a width of about one-eightieth of one millimeter.

The use of multiple slits, as already mentioned, enables narrower slits to be used, thereby obtaining improved definition in the resulting picture. This follows from the fact that if two slits are used, each slit need pick up from the multiple images formed by the lenses 75, only a total area equal to half the area of one image, instead of equal to the whole area of one image, so that the width of the slit can be approximately one-half the width of the slit when only a single slit is used. A double slit arrangement is indicated diagrammatically in Fig. 8, to which reference is now made.

In this Fig. 8, the parts 71 to 75 may be identical with the parts 71 to 75 of Figs. 6 and 7 and so are indicated by the same numerals. The plate 91, corresponding in general to the plate 79 of Figs. 6 and 7, is provided with two parallel slits 93 and 95, relatively close to each other, and arranged as before at a slight angle to the line 38 (Fig. 2) joining the optical centers of the lens elements of the multiple lens, this angle being half as great as the angle when only a single slit is used. Light rays passing through the slit 93 are reflected by the prism 101 and collected by the collecting lens system 103 which corresponds to the collecting lens system 80—81 and which preferably is slightly spaced from the prism 101, although shown practically in contact therewith in Fig. 8, for the sake of compactness. Beyond the collecting lens system 103 the light rays are reflected by the prism 105 to pass to the objective 107, corresponding in general to the high quality objective 83 of Figs. 6 and 7. This objective 107 projects the image of the slit 93 onto the film 109 at the point 111, the film being placed as before in a movable carrier 113 corresponding to the carrier 87 above mentioned.

Light from the second slit 95 is similarly reflected by the prism 121, collected by the collecting lenses 123, again reflected by the prism 125, and projected by the objective 107 to form an image on the film 109 at the point 131, which, as will be seen, is spaced a substantial distance from the point 111 at which the image of the slit 93 is projected.

The prisms are used for the purpose of obtaining substantial separation of the images of the two slits, since the film can only travel through a distance corresponding to the separation of these two images before the image from one slit will begin to overlap and interfere with the image projected onto the film from the other slit. Consequently, the greater the separation between the points 111 and 131 at which the images of the two slits are projected onto the film, the greater will be the usable length of the film and the greater the number of frames which may be photographed.

Reference is now made to Figs. 9 and 10, showing certain advantageous constructional features of the dissecting appliance.

A rigid base 151 of metal, provided with a dovetail 153 for convenient mounting, carries the lens mount 155 which contains the collimating lens 73. Extending crosswise on this base 151 is a rigid metal bar 157 having at its left end two upstanding posts 159 spaced from each other.

A hollow rectangular body 161, extending in a general direction crosswise of the base 151 and parallel to the bar 157, constitutes a mount in which the individual segments or elements of the multiple objective lens 75 are rigidly secured. The left end of this mount 161 is received between the two upstanding posts 159, with considerable free space between the posts and the lens mount, as seen in Fig. 9. A pin 163 extends horizontally through the posts 159 and through the lens mount 161, in a direction parallel to the optical axis of the device. The lens mount 161 is rigidly fixed to the pin 163, but the pin is free to rotate and also to slide longitudinally in the posts 159. A leaf spring 165 secured to one of the posts 159 by screws 167 presses constantly against one end of the pin 163 and thus tends to shift the pin 163 rightwardly when viewed as in Fig. 9.

The other end of the pin 163 is engaged by an arcuate portion at the upper end 171 of a lever pinned at 173 to ears 175 on one of the posts 159, the lower end of the lever being shown at 177 and carrying a micrometer screw 179 which is threaded through the lever arm 177 and bears at its end against the adjacent post 159. The outer end of the screw 179 carries a knurled head 181 for ease of turning, and also carries a cylindrical portion 183 which is graduated as indicated for purposes of calibration.

Thus the pin 163 supports one end of the lens mount 161, being the left hand end when viewed as in Fig. 10. The other or right hand end has a flat bottom which rests loosely upon the upper end of a micrometer adjusting screw 191, the lower portion of which is threaded at 193 into a tapped opening in the bar 157. Intermediate its ends the screw carries a knurled head 195 for ease of turning, and a cylindrical portion 197 which is marked with graduations as shown for calibration purposes.

The adjusting screw 179, 181 is used for focusing the lenses 75 with respect to the slit, while the adjusting screw 191, 195 is used for adjusting the angle between the slit and the line joining the optical centers of the lenses 75. If the screw head 181 be turned to screw the shank 179 farther into the lever arm 177, it will move the lever arm 177 away from the post 159, thus causing the upper end of the lever arm 171 to press longitudinally against the pin 163 and carry the entire pin leftwardly when viewed as in Fig. 9, against the tension of the spring 165, thus carrying the adjacent end of the lens mount 161 in the same direction. The other end of the lens mount simply slides over the top surface of the elevating screw 191. The pin 163 constitutes an accurate slide which guides the lens mount 161 for accurate rectilinear movement. If it is found that the lenses 75 in the mount 161 are too far away from the slit, the knurled head 181 is turned in the opposite direction, to unscrew the shank 179 out of the lever arm 177, whereupon the spring 165 is permitted to shift the pin 163 to move the lens mount 161 closer to the slit.

One end of the lens mount 161 is supported at a constant height by the pin 163. The other end has a variable height controlled by the screw 191, 195, so that this screw may be turned to raise or lower the adjacent end of the lens mount so as to vary the angle between the line joining the optical centers of the lenses 75, on the one hand, and the slit on the other hand.

The plate 79 (or 91) is mounted in a housing 201 (Fig. 9) supported from a post 203 on the base 151, and the collecting lenses 81 are in a housing or mount 205 supported from the same post 203.

In the preferred construction, all of the lenses employed are spherical lenses, comparatively easy to make to high accuracy, and it is not necessary to employ any cylindrical lenses, which are more difficult to make to a correspondingly degree of accuracy. Also, the dissection of the image is controlled by a slit, which is comparatively easy to make to a high degree of accuracy, and there is no necessity for using thin laminations of lenses or other optical elements, for controlling dissection, with consequent difficulties in the manufacture of such thin laminations and difficulties resulting from the optical performance thereof.

It is seen from the foregoing disclosure that the above-mentioned objects of the invention are admirably fulfilled. It is to be understood that the foregoing disclosure is given by way of illustrative example only, rather than by way of limitation, and that without departing from the invention, the details may be varied within the scope of the appended claims.

What is claimed is:

1. An optical image dissector comprising first lens means for projecting multiple complete images of an object, a diaphragm plate in the focal plane of said first lens means and having a relatively long narrow slit therein, said slit being in non-parallel relation to a line drawn from the optical center of that part of the first lens means which produces one of the multiple images to the optical center of that part of the first lens means which produces a different one of the multiple images so that said slit will transmit the light rays from a different portion of each of the multiple images, and other lens means for projecting an image of said slit including a composite of all relatively different portions of the multiple images onto a receiving surface.

2. A construction as described in claim 1, in which said receiving surface is a sensitized photographic surface.

3. A construction as described in claim 1, in which said first lens means comprises a series of objective lenses arranged in side by side relationship.

4. A construction as described in claim 3 in which said objective lenses are spherical lenses.

5. A construction as described in claim 4 in which said slit lies at a slight angle to an axial plane passing through the optical centers of all of said spherical objective lenses.

6. An optical image dissector comprising means for defining an object whose image is to be dissected, a plate spaced from the object and having a relatively long narrow slit therein, a series of objective lenses in side by side relationship for projecting a series of identical real images of the object onto said plate, the optical projection axis of each of said objective lenses intersecting said plate at a different distance from the center line of said slit than the optical projection axis of any other one of said objective lenses so that the portion of each image falling in said slit is different from the portion of every other image falling in said slit, and means including a single objective lens for projecting onto a receiving surface an image of all the portions of said series of first-mentioned images which fall in said slit, in straight-line side-by-side relationship to each other.

7. An optical image dissector comprising means for defining an object whose image is to be dissected, a plate spaced from the object and having at least one relatively long narrow slit therein, a series of objective lenses in side by side relationship for projecting a series of identical real images of the object onto said plate, the optical projection axis of each of said objective lenses intersecting said plate at a different distance from the center line of said slit than the optical projection axis of any other one of said objective lenses so that the portion of each image falling in said slit is different from the portion of every other image falling in said slit, the portions of all of said images falling into said slit collectively including, in dissected form, a complete image of the object, and means including a single objective lens for projecting onto a receiving surface an image of all the portions of said series of first-mentioned images which fall in said slit, in straight-line side-by-side relationship to each other.

8. An optical appliance including a main objective lens, means forming a slit, a series of other objective lenses for forming a series of real images of an object in proximity to said slit, the optical projection axis of each of said series of other objective lenses being at a different distance from the center line of said slit than the optical projection axis of any other one of said series of other objective lenses so that a different portion of each of said real images is alined with said slit, and a collecting lens system interposed between said slit and said main objective to image said series of objectives on said main objective in such position that said main objective will project onto a receiving surface an image of the portions of said real images which are alined with said slit.

9. An optical appliance including a main objective lens, means forming a plurality of slits, a series of other objective lenses for forming a series of real images of an object in proximity to said slits in differential relation thereto so that the portions of each image alined with said slits are different from the portions of every other image alined with said slits, and means for separating the images of said two slits and projecting them through said main objective onto a receiving surface at points substantially spaced from each other.

10. A device for dissecting and reassembling optical images embodying a first lens means for forming a row of identical, complete multiple lens images in a first focal plane, a diaphragm in said first focal plane provided with a narrow slit which extends across all of the images in the row, said slit being in inclined relation to a line drawn from the intersection of said focal plane with the optical projection axis of that part of the first lens means which projects the first image at one end of said row of images to the intersection of said focal plane with the optical projection axis of that part of the first lens means which projects the last image at the other end of said row of images, said slit thus intersecting each image in said row along a different zone thereof so that the slit transmits light from a fractional area of each image and masks off the light from the remainder thereof, and a second lens means for collecting the light transmitted through the slit and forming an image from the light transmitted through the slit as a composite single image of relatively long thin strip form on a receiving surface in a second focal plane.

BRIAN O'BRIEN.

REFERENCES CITED

The following references are of record in the file of this patent:

UNITED STATES PATENTS

| Number | Name | Date |
| --- | --- | --- |
| 1,490,751 | Underhill | Apr. 15, 1924 |
| 1,914,314 | Walton | June 13, 1933 |
| 2,021,162 | Walton | Nov. 19, 1935 |
| 2,061,016 | Walton | Nov. 17, 1936 |
| 2,201,487 | Gretener | May 21, 1940 |
| 2,214,013 | Deninson | Sept. 10, 1940 |
| 2,238,629 | Deninson | Apr. 15, 1941 |
| 2,351,032 | Gabor | June 13, 1944 |